United States Patent Office 3,234,268
Patented Feb. 8, 1966

3,234,268
ALKANOLAMINE SALTS OF SALICYLIC ACID AND USES THEREOF
Edward P. Merica, Midland, Mich., assignor to The Dow Chemical Company, Midland, Mich., a corporation of Delaware
No Drawing. Filed Mar. 5, 1964, Ser. No. 349,746
14 Claims. (Cl. 260—480)

This application is a continuation-in-part of my co-pending prior application Serial Number 43,006, filed July 15, 1960, and now forfeited.

This invention is directed to the alkanolamine salts of salicylic acid. These new salicylates correspond to the formula

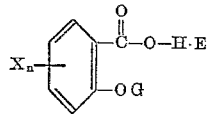

In this and succeeding formulae herein, X represents halogen, phenyl, or lower alkyl; $n$ represents an integer from 0 to 1, inclusive; G represents hydrogen or an acetyl group; and E represents a lower alkanolamine. The term lower alkyl is used in the present specification and claims to refer to an alkyl group containing from 1 to 4 carbon atoms, both inclusive.

The term lower alkanolamine is used to refer to an alkanolamine which contains one only nitrogen atom and it is trivalent, and up to two hydroxyalkyl radicals, of which any hydroxyalkyl radical contains one hydroxyl and from 2 to 5, inclusive, carbon atoms. When such alkanolamines contain two hydroxyalkyl groups they can be called imino-diloweralkanols. All valences of said nitrogen of which the occupancy is not otherwise specified herein are occupied by hydrogen.

The sum of the number of carbon atoms in the largest said hydroxyalkyl radical plus the integer value of $n$ plus the number of acetyl groups at G is at least 3, in any compound claimed herein.

The novel compounds are oily liquids or crystalline solids at room temperature. They are somewhat soluble in water and in each of many organic solvents such as acetone, xylene, and ethanol. The new compounds are herbicides and in particular are aquatic herbicides: they are useful as parasiticides, and are adapted to be employed as active constituents of compositions for the control of many pests such as insects, microbes including bacteria, fungi, and viruses; and nematodes.

The new salicylates of the present invention may be prepared by causing a salicylic acid corresponding to the formula

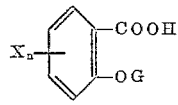

to react with an alkanolamine reactant corresponding to the formula

E wherein X, G, $n$, E and the sum of $n$ and the number of carbon atoms in an alkanol radical of E have the values hereinbefore stated.

The reaction may be caused by combining the starting reactants, the alkanolamine and the salicylic acid. The combining can be carried out in the absence of liquid reaction medium. The present amine reactants are usually liquids when at room temperature and warmer, and, as a reaction mixture of the acid and amine is heated, the products also are liquid at least during the process of formation. However, if desired, the reaction may be carried out by combining the reactant substances in an inert liquid reaction medium which is preferably a solvent, such as diethyl ether or benzene. When such solvent is employed, reaction temperatures can be lower than the freezing temperature of the pure reactants. Good results are obtained when employing substantially equimolecular proportions of the reactants. The reaction is moderately exothermic and takes place readily at temperatures of from 0° C. to 100° C. The temperature of reaction may be controlled by regulating the rate of contacting the reactants, and by external cooling. No by-product is formed and the employment of pure starting materials results in essentially pure products.

In carrying out the reaction, the alkanolamine reactant and the salicylic acid reactant are contacted together; portions of product are formed immediately: the resulting reaction mixture is maintained for a period of time in the contacting temperature range or heated, if desired, to carry the reaction more quickly to completion. Upon completion of the reaction, the desired alkanolamine salt product may be separated from the reaction mixture by conventional methods, such as removal of solvent by fractional distillation under subatmospheric pressures. The compounds may be purified further, if desired, by recrystallization from solvent.

The following examples illustrate the new compounds of the present invention but are not to be considered as limiting.

Example 1.—1-amino-2-propanol salt of salicylic acid

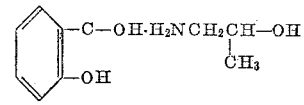

Salicylic acid (13.8 grams; 0.1 mole) and 7.51 grams (0.1 mole) of 1-amino-2-propanol are mixed and blended together at room temperature, approximately 20° C., in carbon tetrachloride (100 milliliters) as reaction medium. Upon completion of the combining of the reactants, the resulting reaction mixture is maintained under reflux at a temperature of between 75° and 80° C., for 1 hour, to carry out the reaction to completion. At the end of the stated reaction period, the reaction mixture is distilled to vaporize and remove solvent and obtain the 1-amino-2-propanol salt of salicylic acid. The said product has a melting temperature below 100° C., and was found to be moderately soluble in water and in acetone, and readily soluble in ethanol. The product exists as a stable, supercooled liquid at room temperature, having a refractive index $n/D$ at 25° C., of 1.5545 and a specific gravity at 25° C. of 1.262 as referred to water at 4° C. The product was tested and was found to be toxic to bacteria and spores of fungi, and to be useful in the control of fungi.

Example 2.—2,2'-iminodiethanol salt of 3-phenylsalicylic acid

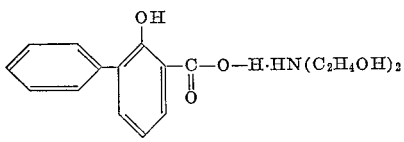

2,2'-iminodiethanol (105 grams; 1 mole) and 214.2 grams (1 mole) of 3-phenylsalicylic acid are intimately mixed and blended together with stirring at 50° C. to prepare a reaction mixture. Heat of reaction raises the temperature of the mixture to approximately 80° C. At the conclusion of such initial temperature rise, the reaction mixture is heated on a steam bath, and stirring is continued for a period of 10 minutes to carry the reaction to completion. Thereafter, the mixture is removed from the steam bath and allowed to cool to room temperature. During the cooling process, the material solidifies and is, when cool, a tan semi-solid. This semi-solid was tested and found to have distinct antimicrobial action. The substance is thereafter recrystallized from acetone and benzene to obtain a nearly white crystalline 2,2'-iminodiethanol salt of 3-phenylsalicylic acid having a molecular weight of 319.3, melting at 98°–101° C. In similar procedures there is prepared a 2,2'-iminodiethanol salt of 3-n-propylsalicylic acid, having a molecular weight of 297.3. Also, a 3,3'-iminodipropanol salt of 3-methylsalicylic acid is similarly prepared.

Example 3.—2,2'-iminodiethanol salt of 5-bromosalicylic acid

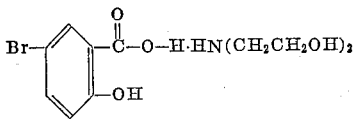

2,2'-iminodiethanol (52.5 grams; 0.5 mole) and 108.5 grams (0.5 mole) 5-bromosalicylic acid are mixed and blended together portionwise and with stirring in a beaker chilled in an ice and salt bath whereby the resulting reaction mixture is maintained at a temperature lower than 60° C. during the combining of the reactants. At the conclusion of an initial period of reaction the mixture is heated on a steam bath for one hour to carry the reaction to completion. The reaction mixture is then allowed to cool, whereupon there is obtained in quantitative yield, a viscous orange oily 2,2'-iminodiethanol salt product of 5-bromosalicylic acid having a molecular weight of 322.2. This product was tested and found to be highly toxic to fungi. In similar procedures there are prepared the 2,2'-iminodiethanol salt of 5-iodosalicylic acid and the 2,2'-iminodiethanol salt of 2--acetoxy-5-bromobenzoic acid.

Other compounds of the present invention were prepared and characterized, and certain of their properties determined. Among the said products were a 1-(2-hydroxy-ethylimino)-2-propanol salicylate product, as a pale yellow oil possessing strong fungicidal properties, prepared by reacting together 1-(2-hydroxyethylimino)-2-propanol and salicylic acid.

A 2-amino-1-butanol salicylate product as an orange, viscous oil relatively soluble in water, acetone and ethanol and having microbicidal properties; prepared by reacting 2-amino-1-butanol and salicylic acid.

A 1-amino-2-propanol salt of 3-fluoro salicylic acid is prepared and tested and found to have, among other properties, insecticidal toxicant action. In essentially pure form it is a viscous orange oil. Also there is prepared a 1-amino-2-butanol salt of 5-tertiary-butylsalicylic acid.

A 2,2'-iminodiethanol 5-chlorosalicylate product was prepared and observed to be a viscous, oily liquid relatively soluble in water, acetone, and ethanol, having a refractive index $n/D$ at 25° C. of 1.5628, a specific gravity of 1.352 at 25° C., as referred to water at 4° C. possessing high antimicrobial power, and prepared by reacting 2,2'-iminodiethanol and 5-chlorosalicylic acid. There is similarly prepared a propanolamine salt of 6-chlorosalicylic acid.

A 2,2'-iminodiethanol acetylsalicylate product was prepared and found to be an orange oily liquid, relatively soluble in water, acetone, and ethanol, of strong fungicidal action; it was prepared by reacting together 2,2'-iminodiethanol and acetylsalicylic acid.

The compounds of the present invention are adapted to be employed as preservatives, parasiticides, and herbicides. For such use, the compounds may be employed in unmodified form. Alternatively, the compounds may be dispersed on an inert finely divided solid and employed as a dust. Also, such preparations may be dispersed in water with or without the aid of a wetting agent and the resulting aqueous suspension employed as a spray or wash. In other procedures, the products may be employed in solvents or as constituents of emulsions, or as aqueous dispersions. Also, the compounds may be used in unmodified form as additives to substances to which it is desired to extend preservative protection, or the compounds may be incorporated into or coated upon wrapping and packing materials to be used in protection of substances which are to be protected.

In a representative operation, the application as a thorough wetting spray to young tomato plants of an aqueous dispersion containing 4 ounces, avoirdupois, of 2-amino-1-butanol salicylate as sole toxicant per hundred gallons by volume of ultimate composition gave the said plants practically complete protection from infestation by subsequent heavy application of live spores of tomato late blight (*Phytophthora infestans*), whereas a similar population of tomato plants identically treated except that the present compound was omitted became heavily infected with the said pathogen. In a further representative operation, the exposure for a period of 24 hours of viable spores of *Fusarium oxysporum lycopersici* (Fusarium blight of tomato) to an aqueous dispersion containing 10 parts of the 2-amino-1-butanol-salicylate per million parts of ultimate dispersion resulted in the almost complete kill of the blight spores; whereas, similar exposure of spores from the same culture to a preparation identical in all respects except that the present salicylate compound was omitted therefrom resulted in no kill whatsoever of the said spores. Similarly, 2-amino-1-butanol is strongly toxic to spores of tomato early blight at rates at which it is harmless to young tomato plants.

It is well known that many food products are susceptible to spoilage from the growth of microorganisms, and especially from the growth of those fungi whose proliferating mycelium forms intact colonial mats, commonly known as molds. The growth of molds on the surface of, or within, foodstuffs where such growth is not desired, causes more or less continuous serious loss to the food processing and food handling industries, as well as to retail consumers of foodstuffs. While many kinds of foodstuffs are seriously affected none is more commonly or seriously affected than dairy products. Molds and allied microorganisms of many species affect such dairy products as milk, butter, and cheese. From a typical sample of cream cheese alone may be identified, in addition to benign microorganisms such as lactic cultures, such undesirable molds as species of Saccharomyces, Actinomyces, Oidium, Cladosporium, Mucor, Alternaria, Penicillium, Trichoderma, Aspergillus, Epioccum, Macrosporium, Monilia, Cephalothecium, Trichlothecium, Gliocaladium, Acrostalagmus, and others.

The present invention is of outstanding value in inhibiting the growth of mold upon a mold-susceptible foodstuff.

Such control is effected by contacting the mold-susceptible foodstuff, or the mold-susceptible portion thereof with at least a mold-inhibiting amount of a compound of the formula

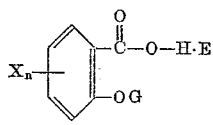

wherein X represents a member of the group consisting of halogen, phenyl, and lower alkyl; n represents an integer from 0 to 1, inclusive; G represents hydrogen or an acetyl group; E represents a lower alkanolamine which contains 1 nitrogen atom and up to two hydroxy alkyl radicals that are each of from 2 to 5, inclusive, carbon atoms: wherein the expression lower alkyl refers to an alkyl group containing from one to four, inclusive, carbon atoms.

The precise weight to be employed will vary according to the physical state, degree of exposure, inherent susceptibility to mold of the foodstuff to be protected and other properties, and can easily be ascertained in simple range-finding tests. In general, good results are obtained when the mold-inhibiting compound is employed in an amount equal to at least 0.25 percent by weight of the combined protected foodstuff and mold-inhibiting chemical material.

However, good results are sometimes achieved by surface application of as little as 0.001 weight percent of the mold inhibiting compound. Higher concentrations, up to 95 weight percent in the case of concentrates, are sometimes preferred.

In a representative operation, an uncured, rennect-coagulated, high-fat, worked-curd cheese, flavored by a culture of a lactic-acid-forming Streptococcus, in part bodied by addition of vegetable gum and having a composition of approximately 35 percent water, 15 percent protein, 1 percent ash, and 44 percent fat as well as other minor constituents (a commercial cream cheese) naturally inoculated with approximately one thousand mold spores per gram was mixed with a small amount of water in a high-speed impeller type mixer (Waring Blendor) and reduced to a thick paste which was artificially heavily inoculated with spores of *Penicillium digitatum*. To one portion of the resulting mixture was added one tenth of one percent by weight of cheese preparation of 2,2'-iminodiethanol salt of salicylic acid; another portion was maintained untreated as a check. Both samples were placed in sterile Petri dishes and incubated for 5 days at 30° C. At the end of this period of time, the untreated check was heavily overgrown with molds of various species, *Penicillium digitatum* predominating. In contrast, the cream cheese preparation containing the 2,2'-iminodiethanol salt of salicylic acid showed no mold or related decomposition. Similar results are obtained when employing 100 parts of said salt per million parts by weight of treated cheese product. Also, at either concentration, good protection of the cheese is obtained when employing the 2-amino-1-butanol salt of salicylic acid. Also, the 2,2'-iminodiethanol salt of 5-chlorosalicylic acid is active as a mold-inhibiting preservative.

All the present alkanolamine salicylates function comparably as preservatives against fungal attack: they differ in properties other than their antimicrobial action, properties such as solubility in various convenient media, by reference to which a choice can be made among the various compounds for control of microorganisms in particular situations.

Not only foodstuffs but, in general, any substance of natural origin that is susceptible of microbial attack is effectively preserved by the method of the present invention. More particularly, presence of the present compounds, as applied in known techniques, upon or within paper, fabric, wood, leather, glues, hides, felts and the like in necessary amounts, protects the said substance from microbial attack.

I claim:
1. A compound of the formula

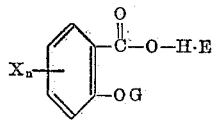

wherein X represents a member of the group consisting of halogen, phenyl, and lower alkyl; n represents an integer from 0 to 1, inclusive; G reresents a member of the group consisting of hydrogen and acetyl; and E represents a lower alkanolamine; wherein the expression lower alkyl refers to an alkyl group containing from one to four, both inclusive, carbon atoms; the expression loweralkanolamine refers to an alkanolamine of up to two hydroxyalkyl radicals of which any hydroxyalkyl radical contains one hydroxyl and from 2 to 5, inclusive, carbon atoms; the sum of the number of carbon atoms in the largest said hydroxyalkyl radical plus the integer value of n plus the number of acetyl groups at G being at least 3.

2. The salt of salicylic acid with 1-(2-hydroxyethyl-imino)-di-2-propanol.
3. The salt of salicylic acid with 2-amino-1-butanol.
4. The salt of salicylic acid with 1-amino-1-butanol.
5. The 2,2'-iminodiethanol salt of 5-bromosalicylic acid.
6. The 2,2'-iminodiethanol salt of 5-chlorosalicylic acid.
7. The 2,2'-iminodiethanol salt of 3-phenylsalicylic acid.
8. The 2,2'-iminodiethanol salt of acetylsalicylic acid.
9. A method of inhibiting the growth of mold upon a mold-susceptible foodstuff which comprises contacting the portions thereof which are exposed to the growth of mold with a mold-inhibiting amount of a compound corresponding to the formula

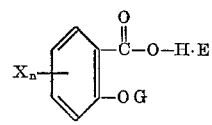

wherein X represents a member of the group consisting of halogen, phenyl, and lower alkyl; n represents an integer from 0 to 1, inclusive; G represents a member of the group consisting of hydrogen and acetyl; E represents a lower alkanolamine: wherein the expression lower alkyl refers to an alkyl group containing one to four, inclusive, carbon atoms, and the expression loweralkanolamine is used to designate an alkanolamine of up to two monohydroxyalkyl radicals of which any contains from 2 to 5, inclusive, carbon atoms.

10. Method of claim 9 wherein the mold-inhibiting compound is employed in an amount equal to at least 0.25 percent by weight of mold-susceptible foodstuff contacted.

11. Method of claim 10 wherein the mold inhibiting compound is the 2,2'-iminodiethanol salt of salicylic acid.

12. Method of claim 10 wherein the mold-inhibiting compound is the 2,2'-iminodiethanol salt of 5-chlorosalicylic acid.

13. A method of inhibiting the growth of mold upon a mold-susceptible substance of natural origin which comprises contacting the portions thereof which are exposed to the growth of mold with a mold-inhibiting amount of a compound corresponding to the formula

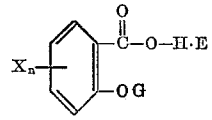

wherein X represents a member of the group consisting of halogen, phenyl, and lower alkyl; n represents an integer from 0 to 1, inclusive; G represents a member of the group consisting of hydrogen and acetyl; E represents a lower alkanolamine: wherein the expression lower alkyl refers to an alkyl group containing one to four, inclusive, carbon atoms, and the expression loweralkanolamine is used to designate an alkanolamine of up to two monohydroxyalkyl radicals of which any contains from 2 to 5, inclusive, carbon atoms.

14. Method of claim 13 wherein the mold inhibiting compound is the 2,2'-iminodiethanol salt of salicylic acid.

References Cited by the Examiner
UNITED STATES PATENTS

| | | | |
|---|---|---|---|
| 2,596,674 | 5/1952 | Gaudin | 260—501 X |
| 2,731,492 | 1/1956 | Kamlet | 260—480 |
| 2,890,119 | 6/1959 | Minkler et al. | 99—150 |
| 2,934,438 | 4/1960 | Michener et al. | 99—150 |
| 3,091,633 | 5/1963 | Strube | 260—480 |
| 3,098,097 | 7/1963 | Grob et al. | 260—480 X |

A. LOUIS MONACELL, *Primary Examiner.*